United States Patent
Nilsson et al.

(10) Patent No.: US 9,571,871 B2
(45) Date of Patent: Feb. 14, 2017

(54) METHOD FOR DELIVERING VIDEO CONTENT ENCODED AT ONE OR MORE QUALITY LEVELS OVER A DATA NETWORK

(75) Inventors: Michael Erling Nilsson, London (GB); Stephen Clifford Appleby, London (GB); Rory Stewart Turnbull, London (GB); Ian Barry Crabtree, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 451 days.

(21) Appl. No.: 13/997,474

(22) PCT Filed: Dec. 20, 2011

(86) PCT No.: PCT/GB2011/001742
§ 371 (c)(1),
(2), (4) Date: Jun. 24, 2013

(87) PCT Pub. No.: WO2012/085504
PCT Pub. Date: Jun. 28, 2012

(65) Prior Publication Data
US 2013/0291032 A1    Oct. 31, 2013

(30) Foreign Application Priority Data
Dec. 23, 2010 (EP) .................... 10252204

(51) Int. Cl.
*H04N 7/173* (2011.01)
*H04N 21/262* (2011.01)
(Continued)

(52) U.S. Cl.
CPC ........ *H04N 21/26208* (2013.01); *H04L 47/38* (2013.01); *H04L 47/801* (2013.01);
(Continued)

(58) Field of Classification Search
CPC .......... H04N 21/26208; H04N 21/23439; H04N 21/23805; H04N 21/2401; H04N 21/25833; H04N 21/25858; H04N 21/64738; H04N 21/64769; H04N 19/146; H04N 19/154; H04N 19/18; H04N 19/177; H04L 47/38; H04L 47/801; H04L 47/822; H04L 65/4084; H04L 65/4092; H04L 65/602; H04L 65/80

See application file for complete search history.

(56) References Cited

U.S. PATENT DOCUMENTS

2009/0287841 A1    11/2009  Chapweske et al.
2010/0169303 A1*    7/2010  Biderman et al. ............ 707/723

FOREIGN PATENT DOCUMENTS

EP    2 219 342        8/2010
WO    2008/119954    10/2008

OTHER PUBLICATIONS

Nilsson, Mike et al., "Equitable quality video streaming for IP networks", Int. J. Internet Protocol Technology, vol. 4, No. 1, 2009 (14 pgs.).

(Continued)

Primary Examiner — Oschta Montoya
(74) Attorney, Agent, or Firm — Nixon & Vanderhye PC

(57) ABSTRACT

A client device receives streamed encoded content data, such as encoded video data, which has been encoded at a constant perceptual quality. Several different versions of the content are available to be streamed to the device, at different perceptual quality levels. In order to decide which quality level to request from a content server at intervals the device calculates the delivery rates that would be required for each level of quality. The calculation of the delivery levels is made in dependence on whether the actual delivery rate that has been received so far is greater than or less than a constant (Continued)

bit rate delivery schedule that decreases monotonically but which guarantees to deliver the encoded data in a timely manner such that no buffer underflow and interruption of reproduction takes place. The monotonically decreasing bit rate schedule is defined by one or more "critical points", which are the points at which the bit rates are decreased, and correspond to the points where the delivery schedule is just equal to the decoding schedule of the encoded data. At such points there would be no encoded data in a buffer at the client. If the delivery rate has been greater than the constant bit rate schedule for a quality then the delivery rate required going forward for a particular quality level can be calculated from the critical point information, and no more complicated calculation is required.

11 Claims, 11 Drawing Sheets

(51) Int. Cl.

| | | |
|---|---|---|
| *H04L 12/811* | (2013.01) | |
| *H04L 12/927* | (2013.01) | |
| *H04L 12/911* | (2013.01) | |
| *H04N 21/2343* | (2011.01) | |
| *H04N 21/238* | (2011.01) | |
| *H04N 21/24* | (2011.01) | |
| *H04N 21/258* | (2011.01) | |
| *H04N 21/647* | (2011.01) | |
| *H04L 29/06* | (2006.01) | |
| *H04N 19/146* | (2014.01) | |
| *H04N 19/154* | (2014.01) | |
| *H04N 19/18* | (2014.01) | |
| *H04N 19/177* | (2014.01) | |

(52) U.S. Cl.
CPC ........ *H04L 47/822* (2013.01); *H04L 65/4084* (2013.01); *H04L 65/4092* (2013.01); *H04L 65/602* (2013.01); *H04L 65/80* (2013.01); *H04N 19/146* (2014.11); *H04N 19/154* (2014.11); *H04N 19/177* (2014.11); *H04N 19/18* (2014.11); *H04N 21/23439* (2013.01); *H04N 21/23805* (2013.01); *H04N 21/2401* (2013.01); *H04N 21/25833* (2013.01); *H04N 21/25858* (2013.01); *H04N 21/64738* (2013.01); *H04N 21/64769* (2013.01)

(56) References Cited

OTHER PUBLICATIONS

Alam, Farhad et al., "Multiple Bitstream Switching for Video Streaming in Monotonically Decreasing Rate Schedulers", Department of Electronics Engineering, Aligarh, UP, India and Department of Electronic Systems Engineering, Colchester, UK, 2006 IEEE (6 pgs.).

Chen, Lian-kuan et al., "A Monotonic-Decreasing Rate Scheduler for Variable-Bit-Rate Video Streaming", IEEE Transactions on Circuits and Systems for Video Technology, vol. 15, No. 2, Feb. 2005 (11 pgs.).

International Search Report for PCT/GB2011/001742, mailed Apr. 18, 2012.

\* cited by examiner

METHOD FOR DELIVERING VIDEO CONTENT ENCODED AT ONE OR MORE QUALITY LEVELS OVER A DATA NETWORK

This application is the U.S. national phase of International Application No. PCT/GB2011/001742 filed 20 Dec. 2011 which designated the U.S. and claims priority to EP Patent Application No. 10252204.2 filed 23 Dec. 2010, the entire contents of each of which are hereby incorporated by reference.

TECHNICAL FIELD

The present invention relates to a method and system for the determination of data transfer rates required for the streaming of variable bit rate encoded video data over a network. In some embodiments the determined data transfer rates are then used to select a video quality to be provided over the network for reproduction.

BACKGROUND TO THE INVENTION

Traditionally a video on demand service, such as that provided commercially in the UK under the trade name BT Vision, is supported by encoding video at a constant bit rate and delivering it over a network at the same constant bit rate. This generally requires bandwidth reservation on the network, which can be expensive to provide. Video encoded using compression techniques naturally has variable bit rate, as the number of bits produced when encoding a picture depends on the picture content: how similar it is to previously encoded pictures and how much detail it contains. Some video scenes can be coded to a given quality with a small number of bits, whereas other scenes may require significantly more bits to achieve the same quality. When constant bit rate (CBR) encoding is used, video has to be coded at time varying quality to meet the bit rate constraint. This has been shown to be sub-optimal to the user, who would prefer to see constant quality. Also, by fixing the bit rate independent of the genre of the video content, some genres of content can be encoded well, such as news and drama, whereas others, such as fast moving sport and music videos and concerts, can only be coded quite poorly.

In order to address the perceived image quality issues with CBR encoded video, variable bit rate (VBR) encoded video can be provided, where the video is encoded at a variable rate so as to provide for substantially constant quality. In this respect, WO 2009/112801, incorporated herein by reference in its entirety for all purposes, describes how video data may be encoded to allow for substantially constant perceived quality on the part of a viewing user. However, due to the variability of instantaneous bit rate of VBR encoded data, delivery of variable bit rate encoded data over a network can itself be problematic, if the network is to deliver the data sufficiently quickly such that all video data is delivered in time for it to be decoded and displayed without interruption. In particular, parts of the VBR encoded data which have a high number of bits per frame, such as action sequences or the like, may lead to high instantaneous data rate requirements which the network is unable to deliver. Such situations may then lead to buffer underflow at the decoding client, and hence interruptions in delivery.

In order to avoid such buffer underflow conditions occurring it is therefore important to control carefully the data transfer rate and video data quality (which itself dictates the amount of data to be delivered) such that quality can be improved where possible, whilst preventing buffer underflow conditions occurring.

SUMMARY OF THE INVENTION

In one embodiment of the invention a client device receives streamed encoded content data, such as encoded video data, which has been encoded at a constant perceptual quality. Several different versions of the content are available to be streamed to the device, at different perceptual quality levels. In order to decide which quality level to request from a content server at intervals the device calculates the delivery rates that would be required for each level of quality. The calculation of the delivery levels is made in dependence on whether the actual delivery rate that has been received so far is greater than or less than a constant bit rate delivery schedule that decreases monotonically but which guarantees to deliver the encoded data in a timely manner such that no buffer underflow and interruption of reproduction takes place. The monotonically decreasing bit rate schedule is defined by one or more "critical points", which are the points at which the bit rates are decreased, and correspond to the points where the delivery schedule is just equal to the decoding schedule of the encoded data. At such points there would be no encoded data in a buffer at the client. If the delivery rate has been greater than the constant bit rate schedule for a quality then the delivery rate required going forward for a particular quality level can be calculated from the critical point information, and no more complicated calculation is required.

In view of the above from a first aspect there is provided a method for delivering encoded content data over a network, the content data being encoded at one or more quality levels, the method comprising: determining one or more respective data rates required to deliver the encoded content data at the one or more quality levels; and selecting a quality level for delivery in dependence on at least the one or more determined respective data rates; the method being characterised in that the determining of a data rate for a particular quality level comprises: being provided with pre-calculated data defining one or more critical points on a decoding schedule of the encoded data at the particular quality level, the critical points being points at which a piecewise monotonic decreasing constant bit rate delivery schedule required to deliver the encoded content data so that buffer underflow does not occur is equal to the decoding schedule; and when actual delivery of the encoded content data is ahead of the constant bit rate delivery schedule, calculating the data rate required for delivery of remaining encoded data at the particular quality level in dependence on at least the critical points on the decoding schedule.

With the above, where the delivery rate is ahead of the "downstairs" rate defined by the constant bit rate delivery schedule then the calculation of required delivery rate for a particular quality becomes very straightforward, and can be performed using the so-called "critical points". This means that the amount of pre-calculated data that is required is reduced than has heretofore been the case.

Within an embodiment a critical point defines a cumulative bit count $B_{dcp}$ at a specific time $T_{dcp}$ in the decoding schedule for a set of encoded content data of a particular quality level. Moreover within the embodiment the data rate for a particular quality is calculated in further dependence on the decoding schedule of the set of encoded content data of the quality, and the amount of encoded content data already delivered and decoded.

In more detail, within the embodiment the calculation of the data rate comprises: determining a latest timepoint Tr in the set of encoded content data at which already delivered bits will be decoded; determining a cumulative bit count Bd for the particular quality level at the latest time Tr; determining the present timepoint Ta in the set of encoded content data corresponding to the data just decoded; and determining the required data rate as the ratio of the difference between the cumulative bit count Bdcp of the critical point and the cumulative bit count Bd at the latest time Tr, and the difference between the time Tdcp of the critical point and the present timepoint Ta.

In one embodiment, when actual delivery is behind the constant bit rate delivery schedule, then the delivery rates required are found by determining the amount of reproduction time Sg available at the present quality from any received encoded content data that has not yet been decoded, and comparing the determined amount with a pre-calculated threshold $S^{min}g$, wherein the calculating the data rate of a particular quality is made in dependence on at least the critical points if Sg is greater than the threshold $S^{min}g$.

In this embodiment if the reproduction time available Sg is less than the pre-calculated threshold $S^{min}g$ then the data rate is calculated in dependence on a pre-calculated zero start-up delay rate, and a data rate calculated to the critical point as if there had been $S^{min}g$ data available. In this embodiment the data rate may be interpolated between the $S^{min}g$ rate and the pre-calculated zero start-up delivery rate.

Thus, even if the data rate is not in excess of the "downstairs" rate, then it becomes possible to still calculate the data rate required. In particular, provided the amount of buffered data is greater than a pre-calculated threshold then it still becomes possible to use the critical points to find the data rates for different qualities.

In one embodiment the data rate is calculated in respect of a plurality of sets of encoded video data of a respective plurality of qualities. In this way, the data rate can be found for each quality available.

In one embodiment the method further comprises receiving a set of meta-data relating to encoded content to be received, the meta-data comprising pre-calculated data relating to properties of the sets of encoded content data of the plurality of qualities. This meta-data is usually provided before streaming commences. It includes the pre-calculated data needed by the client device to be able to calculate the rates required for different quality encoded content data.

In one embodiment the set of meta data comprises, for each set of encoded video data of a particular quality, for each unit of encoded data in a set, a cumulative bit count, a time threshold value $S^{min}g$, and a zero-start up delay rate value.

In one embodiment the set of meta-data further comprises the pre-calculated data defining the one or more critical points.

From another aspect there is also provided a method of operating a video content server, comprising: storing a plurality of sets of encoded content data, encoded at a plurality of constant perceptual qualities; streaming the encoded content data of one of the sets of a first quality to a client device operating in accordance with any of the preceding claims; receiving requests from the client device to stream encoded content data of a second perceptual quality; and streaming the encoded content data of the set of the requested second quality to the client device.

Hence, the client device is able to request switches of quality mid-stream, using a decision based on the rates that it has calculated.

In one embodiment the content server is further arranged to store meta data relating to the stored sets of encoded content data, the meta-data comprising pre-calculated data relating to properties of the sets of encoded content data of the plurality of qualities. In particular, in one embodiment the set of meta data comprises, for each set of encoded video data of a particular quality, for each unit of encoded data in a set, a cumulative bit count, a time threshold value $S^{min}g$, and a zero-start up delay rate value.

Within this embodiment the video content server generates the meta-data by analysing the sets of encoded content data.

Within embodiments of the invention the encoded content data is video content data. The video content data is variable bit rate encoded to provided constant perceptual quality.

BRIEF DESCRIPTION OF THE DRAWINGS

Further features and advantages of the present invention will become apparent from the following description of an embodiment thereof, presented by way of example only, with reference to the accompanying drawings, wherein like reference numerals refer to like parts, and wherein.

DESCRIPTION OF THE EMBODIMENTS

An embodiment of the invention will now be described, by way of example only. More particularly we describe below the operating environment of the present embodiment in terms of the system architecture of the embodiment, and a brief overview of operation. We then address how a required data transfer rate can be calculated for a particular encoded video file (or other "chunk" or set of video data) when the received data rate is in excess of that required to allow timely reproduction of the whole file or chunk. Thereafter we describe how the required data rate can be found when the received data rate is less than that required to permit timely reproduction of the whole file (or chunk). We then finally describe how the two rate calculation techniques are combined in the embodiment to permit rate calculation so as to allow optimal video quality selection.

Overview, and Operating Environment

In the embodiment of the invention to be described we model the network as one or more network based video servers connected to one or more video receivers over a shared network. Multiple pieces of video content are encoded at a number of constant quality levels and stored on one or more of the network based servers. In response to requests from users, video content is selected on a server and delivered over the shared network to the user. The system selects the quality level to deliver based on the video content currently being delivered, the amount of video data already buffered at the video receiver, and the available network throughput. One of the aims of the embodiment is to adapt the quality of video delivered according to the available network throughput so as maximise the quality of video delivered while ensuring that all video data is delivered over the network in time for it to be decoded and displayed without interruption.

As background to the understanding of the embodiment, a video sequence that has been encoded at variable bit rate can be delivered over a network at piecewise constant bit rate, with the rate of each piece decreasing monotonically. The resulting bit rate profile is referred to herein as a "downstairs" function. Our international patent application (Ghanbari and Sun), published as WO2004/047455, describes one method of analysing a video sequence that has been encoded at variable bit rate to determine a video delivery schedule for that sequence consisting of one or more contiguous periods of constant bit rate delivery in which the rates are monotonically decreasing.

Figure 4:
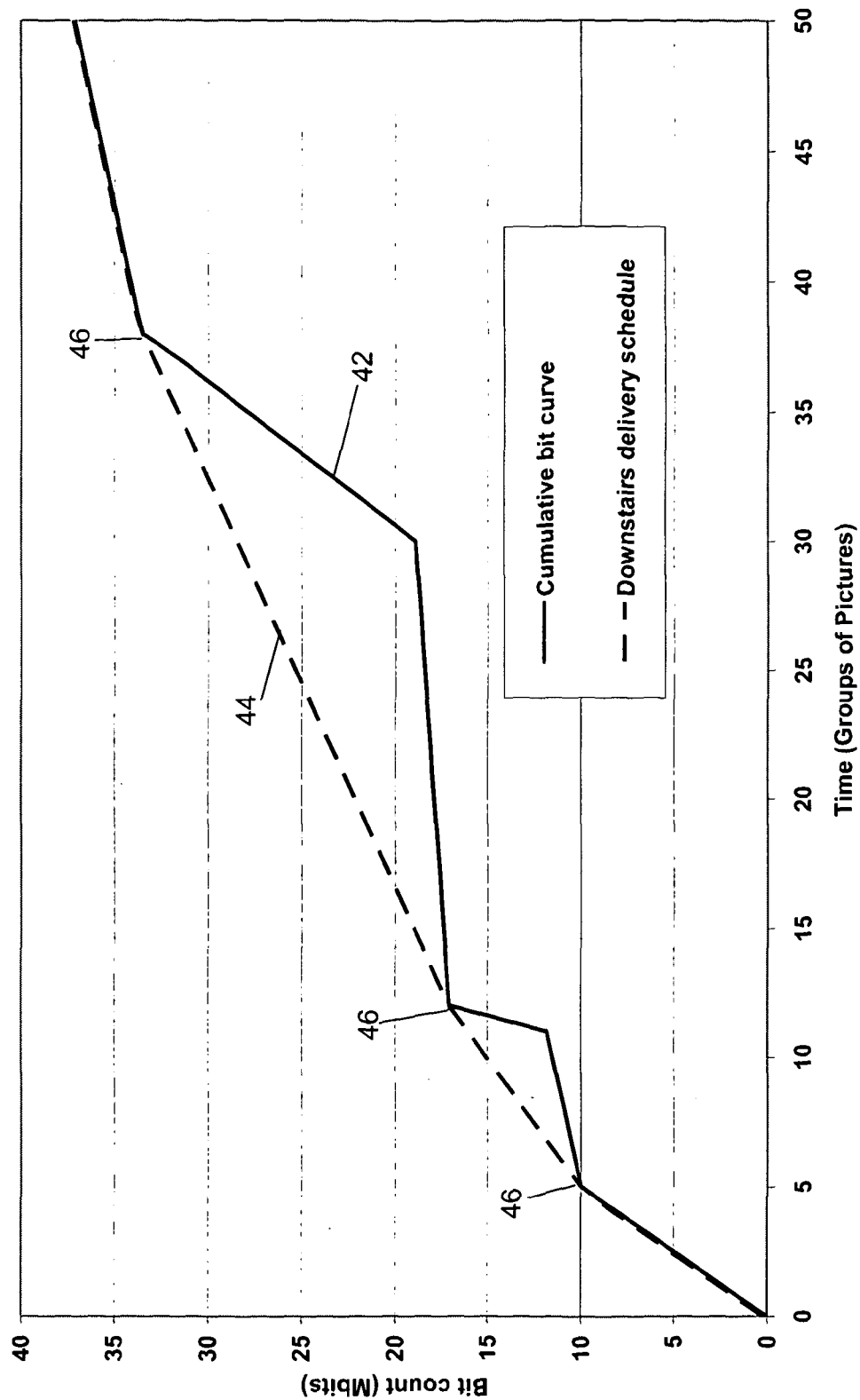
FIG. 4 is a graph of a cumulative bit curve.

An alternative visualisation is described in our international patent application WO2010/067050, where the cumulative number of bits in the encoded video sequence is plotted against time. An example of such a cumulative bit curve (also referred to as the decoding schedule) is shown in FIG. 4. This is simply a plot of the total number of bits in the coded video sequence to date against time. The "downstairs" delivery rate required for initial delivery of this stream is the slope of the line of lowest slope that passes through the origin and is never to the right of the cumulative bit profile, that is, ensuring all bits are delivered before they are needed for decoding. Such a delivery line (or delivery schedule) will touch the cumulative bit curve in one or more places, but typically only once. When delivery to that point (or the last of those points) in the video sequence has occurred, all video bits delivered will be decoded and no bits will be buffered awaiting subsequent decoding. From this point onwards, a new line of lowest slope could be calculated, and the next coded video bits delivered at this lower rate. These points where the delivery rate just touches the cumulative bit curve, and then changes rate (typically decreasing) are referred to as "Downstairs Critical Points" (DCPs), and are shown as points 46 in FIG. 4. In addition, in FIG. 4 the cumulative bit curve is shown as solid line 42, and the resulting downstairs delivery schedule as dashed line 44. Note that as the delivery rates are shown as straight lines, then they are constant delivery rates between each DCP.

Video that is encoded at constant bit rate will have a cumulative bit curve near to a straight line. Video that is not coded at constant bit rate, for example, video coded with constant quantisation index or with constant perceptual quality will have a cumulative bit curve that in general will not be a straight line. Such video could be transmitted over a network with a delivery schedule similar to the cumulative bit curve, and thus require little buffering in the receiver, or, with unlimited buffering in the receiver, could be delivered with any delivery schedule subject to every bit being received before it is needed for decoding. When plotted on a graph, with time along the horizontal axis and cumulative bits on the vertical axis, this requirement can be expressed as the delivery schedule must never be to the right of the cumulative bit curve. When there is unlimited buffering at the receiver, it is always possible to deliver any bitstream using constant bit rate delivery at any constant rate: it is just necessary to ensure decoding is delayed sufficiently to keep the delivery schedule to the left of the cumulative bit curve. In the extreme case, the whole of the video sequence could be delivered very slowly and decoding started only as the delivery is about to finish.

In the examples considered here, we consider discrete "chunks" each comprising one or more frames. The choice of chunks is subject to the consideration that, in order to keep to a minimum any interdependence of quality between chunks, a chunk can be one or more frames coded independently of any other chunk, typically starting with an I-frame (one coded without prediction from any other frame). In the examples here, the chunk chosen was a group of pictures (GOP) of IBBP format and all the plots shown are of cumulative bits per group of pictures, $\Sigma b$, where b is the number of bits in a group of pictures, plotted against group of pictures index.

In the streaming system envisioned, each video sequence is encoded multiple times, each time with a different level of perceptual quality. As mentioned, encoding at fixed levels of perceptual quality level is preferably performed as described in our co-pending International patent application no. WO 2009/112801. However other methods of encoding could also be used, such as coding with constant quantisation index.

We also assume in the embodiment that the client device has sufficient buffering to be able to store a whole video stream. This allows the timing of delivery of the video data to be decoupled from the decoding of it, provided we ensure data is delivered before it is needed for decoding.

The delivery bit rate required to deliver a video stream in timely fashion depends on how much data is already buffered at the client, and the bit rate profile of the bits yet to be decoded. By analyzing the video stream prior to delivery, and by monitoring the amount of data buffered at the client, we can determine, for each possible quality level that could be delivered, the bit rate required for timely delivery, as will be described later.

The operating environment of the present embodiment will next be described with respect to FIGS. 1 and 2.

Figure 1:
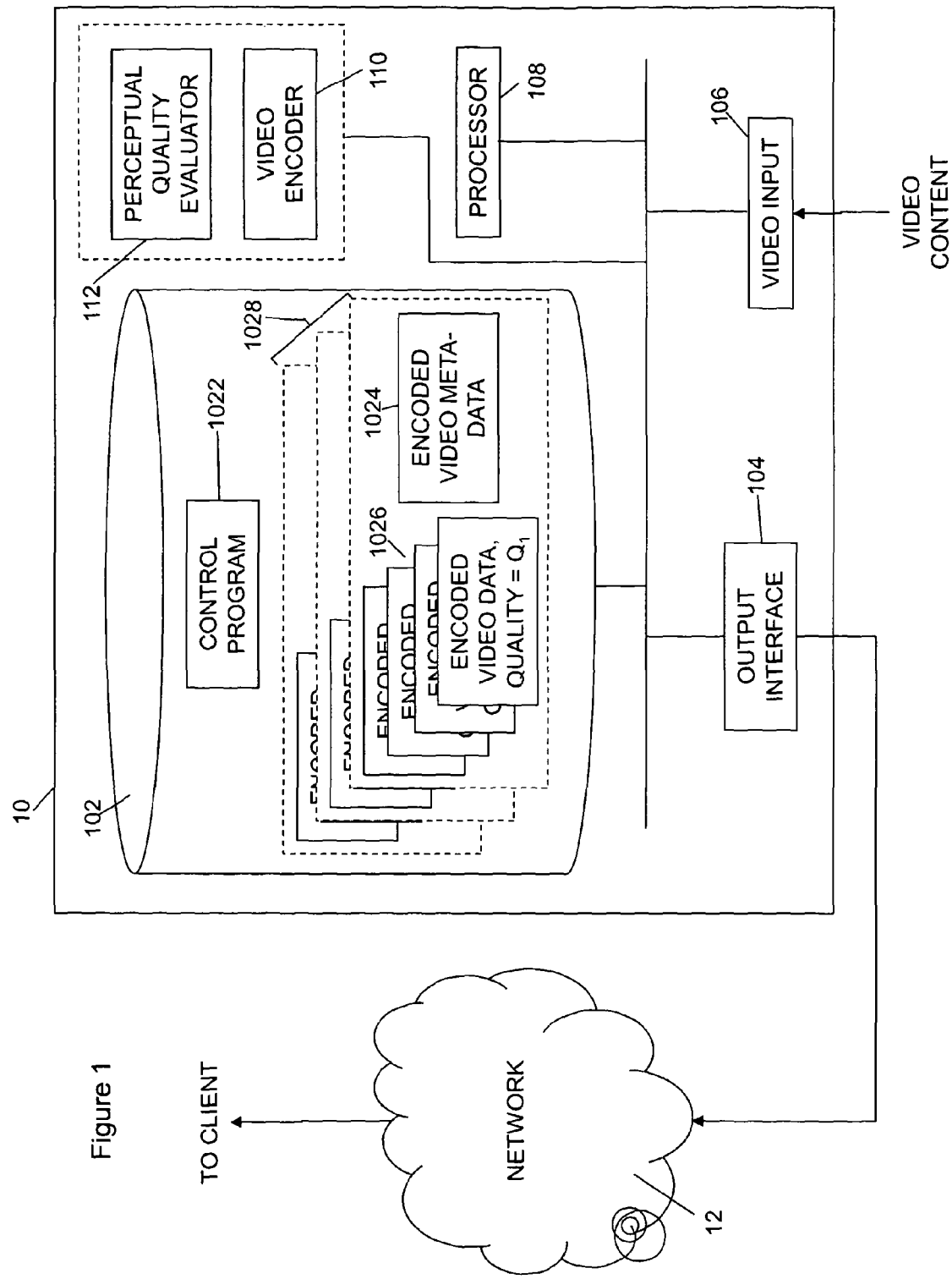
FIG. 1 is a block diagram of a video content server of an embodiment.

More particularly, FIG. 1 illustrates a video content server 10, which is arranged to supply encoded video data to a client for reproduction, via a network 12. The video content server 10 comprises a processor 108, arranged to control a video content server, and to perform any processing required. An input interface, in the form of video input 106 is provided, at which unencoded video content can be input. An output interface 104 is provided, at which encoded video output can be streamed over network 12 to the client. Additionally included is a video encoder 110, and a perceptual quality evaluator 112. The video encoder 110 encodes unencoded video data passed to it, according to at least one known video encoding standard. For example, the video encoder 110 may encode video in accordance with the ITU-T H.264 video coding standard. In addition, the video coder 110 is able to encode video at different qualities, under the command of the perceptual quality evaluator 112. That is, during encoding the perceptual quality evaluator 112 controls the video encoder 110 so that the perceived quality of the encoded video is substantially constant, as described previously.

Video content server 10 also includes a computer readable storage medium 102, such as a hard disk drive, or the like. For example, computer storage medium 102 may be an array of hard disk drives, where significant levels of storage are required. The computer readable storage medium 102 stores a control program 1022 which is run by the processor 108 so as to control the overall operation of video content server, to provide the functions to be described. Also stored on computer readable storage medium 102 are sets of encoded video data 128, each representing an item of video content, for example an individual movie, television program, music video, or the like. Each set of encoded video data 128 comprises multiple encoded versions of the video data 1026, each encoded version being of different video data quality. As shown in FIG. 1 four different quality versions of the encoded video data may be produced, but this is by way of illustration only, and in other embodiments a larger or smaller number of different qualities of encoded video data may be produced, in some embodiments as many as nine. Each set of encoded video data also includes encoded video meta data 1024, containing various pre-calculated data regarding each different quality encoded bit stream. Further details of encoded video meta data 1024 will be described later with respect to FIG. 3.

Figure 2:
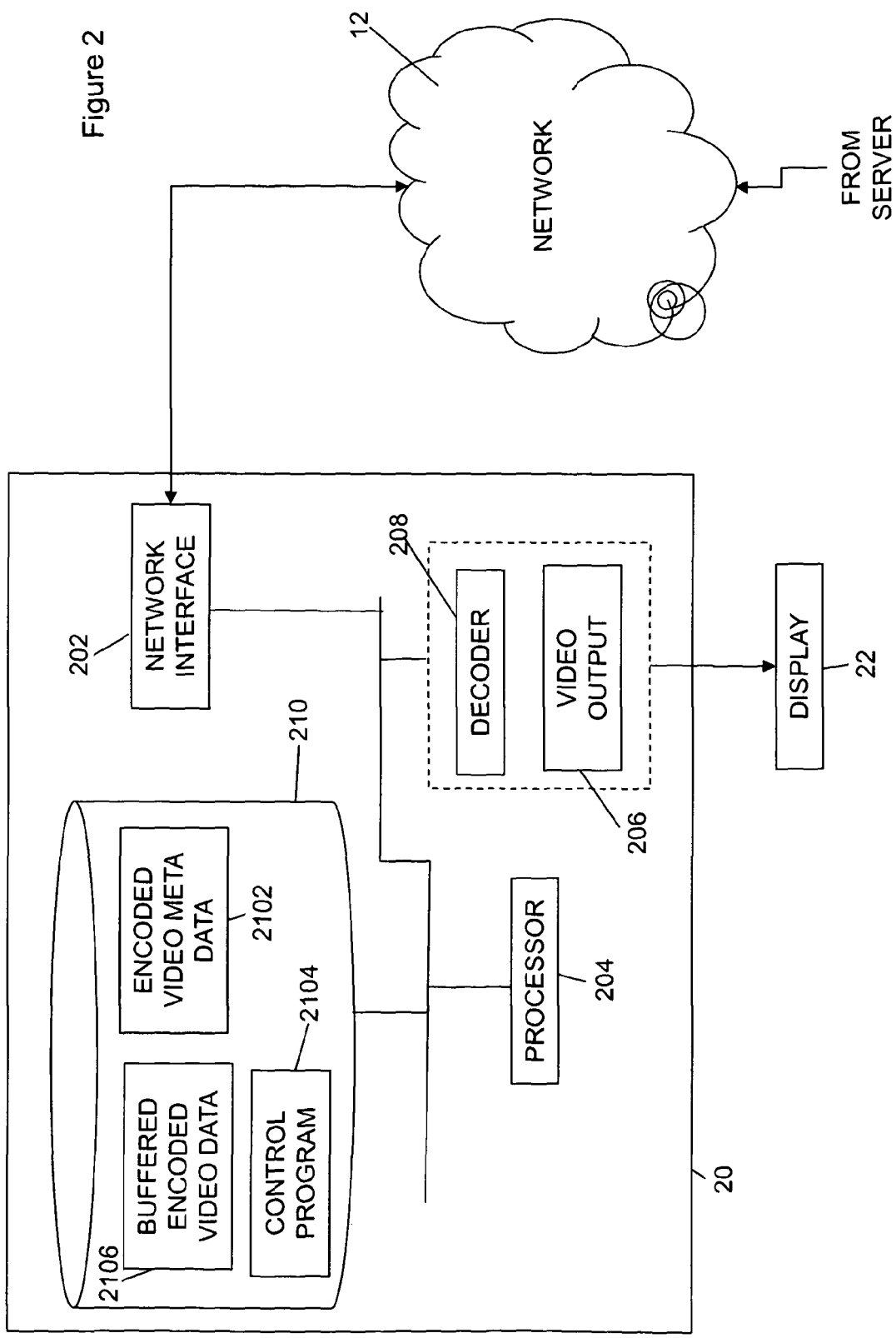
FIG. 2 is a block diagram of a client device of an embodiment.

FIG. 2 illustrates an example client, being a consumer of the encoded video data. In particular, client device 20 comprises a processor 204, and computer readable storage medium 210. Client device 20 also comprises network interface 202, which is able to receive data from and transmit data to network 12. Therefore, network interface 202 receives streamed encoded video data over the network 12 from the video content server 10. Client device 20 also comprises video content decoder 208, which is able to decode encoded content, and provide a video signal to a video output 206, which can then be used to drive a display 22. Display 22 may be integrated with the client device 20, or may, for example, be separate. It will be understood that the client device 20 may be many different types of device, such as, for example, a personal computer, a tablet computer, an internet enabled television, a smart phone, a portable AV player, or the like.

Computer readable storage medium 210, which may, for example, be a hard disk drive, flash drive, or other solid state storage, stores a control program 2104, which controls the operation of the processor 204 to provide the functions to be described. Also stored on computer readable storage medium 210 is buffered encoded video data 2106, which is video data which has been received via the network interface 202, and stored on the computer readable storage medium 210 before it is required by the decoder 208 for decoding, and output as a video signal to drive display 22. In addition, computer readable storage medium 210 also stores encoded video meta data 2102, which is the video meta data relating to the present set of video data that is being received and reproduced by the client device 20, and which has been streamed from the server. Typically, within the embodiment the encoded video meta data 2102 is provided to the client as a first download from the video content server, when the client requests access to particular video content. The video meta data is then stored, and is used in subsequent delivery rate calculations, as will be described.

Figure 3:
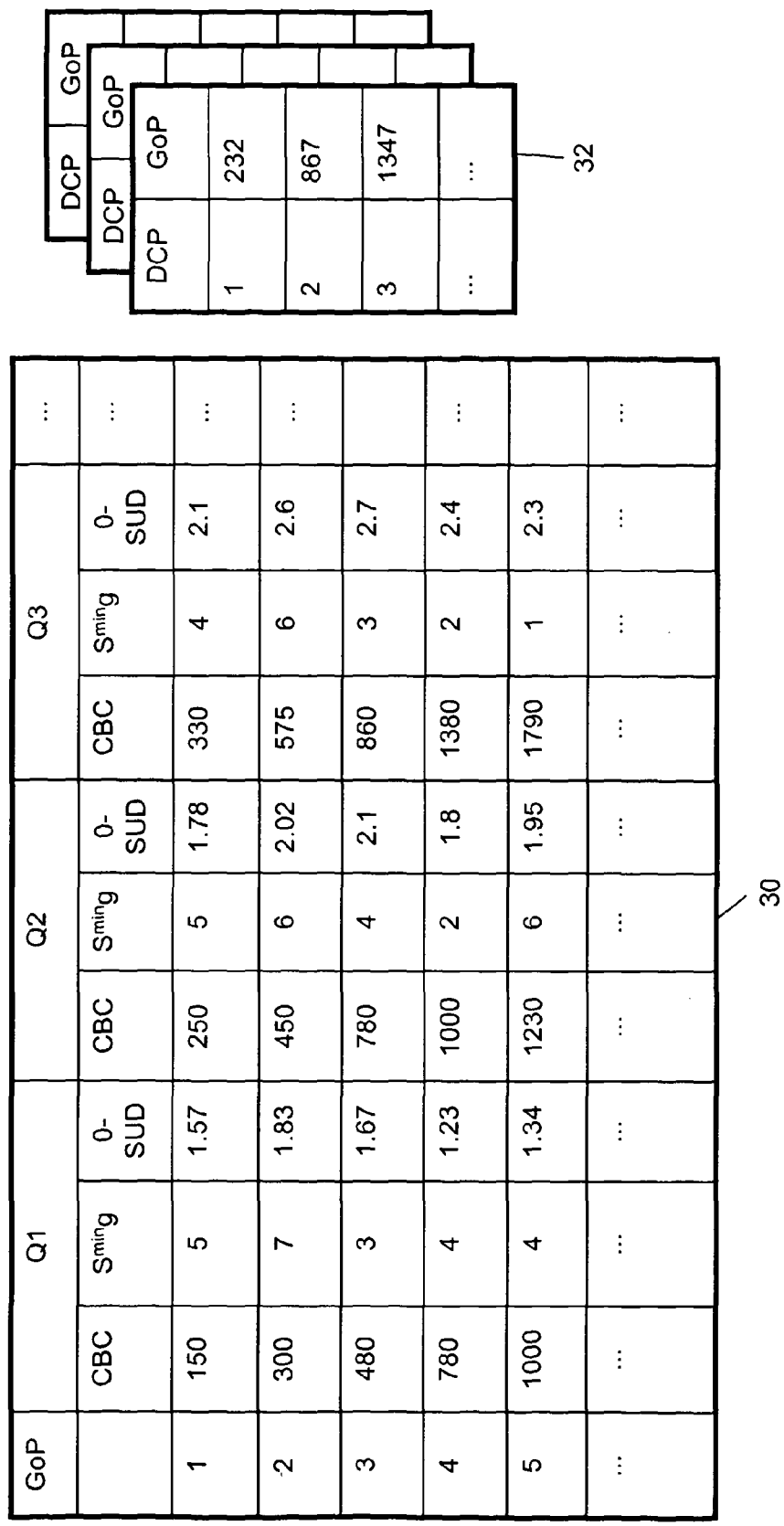
FIG. 3 is a set of tables of pre-calculated meta-data.

The content of the encoded video meta data for a particular video file in the present embodiment is shown in FIG. 3. In particular, video meta data 1024 or 2102 (when downloaded to the client device) comprises in this embodiment two tables of data 30 and 32. In particular, table 30 contains entries for sets of video data encoded at different qualities. Therefore, as will be seen, there is a set of pre-calculated data for the encoded video data of quality Q1, Q2, Q3, etc. etc. For a particular quality level pre-calculated data is included for each time base point, in this case measured by group of picture (GoP) index, of the encoded video data. Thus, as will be seen, the actual decoding schedule in the form of the cumulative bit curve is represented, as a series of cumulative bit counts, taken at the end of each GoP. In addition, a second value, which is a time threshold value, $S^{min}_g$ is provided, in this case measured in terms of the time base, which in this example is numbers of groups of pictures, and which is used as a threshold value to compare a buffer size that must be present at the end of each group of picture, in order for a particular rate delivery calculation to be performed. Finally, for each GoP a delivery rate value, referred to as the zero start up delivery rate is included. This is the delivery rate that is required moving forwards in the decoding schedule from the particular GoP against which a particular rate is indexed. Thus, it follows that, that for higher quality levels, where more bits need to be delivered, the zero start up delay delivery rate for the same GoP, will usually be higher (although it does depend on the particular encoding). Likewise, the cumulative bit count at a particular GoP for increasing quality levels, will also increase.

In addition, the meta data also includes a second table 32, which indicates where in the decoding schedule the downstairs critical points occur. Hence, table 32 contains an index to downstairs critical points, against the GoP numbers at which they occur. In this example a separate table is included for each quality Q1, Q2, etc.

It should be noted that the specific numbers given in tables 30 and 32 of FIG. 3 are purely by way of example only and should not be taken as indicative of actual values that may be obtained for a particular video file.

It will be appreciated that the specific values included in tables 30 and 32 of the meta data 1024 are specific to each set of video data 1028 that is encoded at different quality levels. Hence, when the client device 20 requests a new video file to be streamed to it, the specific encoded video meta data 1024 for that video file must be provided to the client device, and stored thereat, so that the client device can determine particular delivery rates required whilst the video content is being streamed to it.

Figures 10, 11:
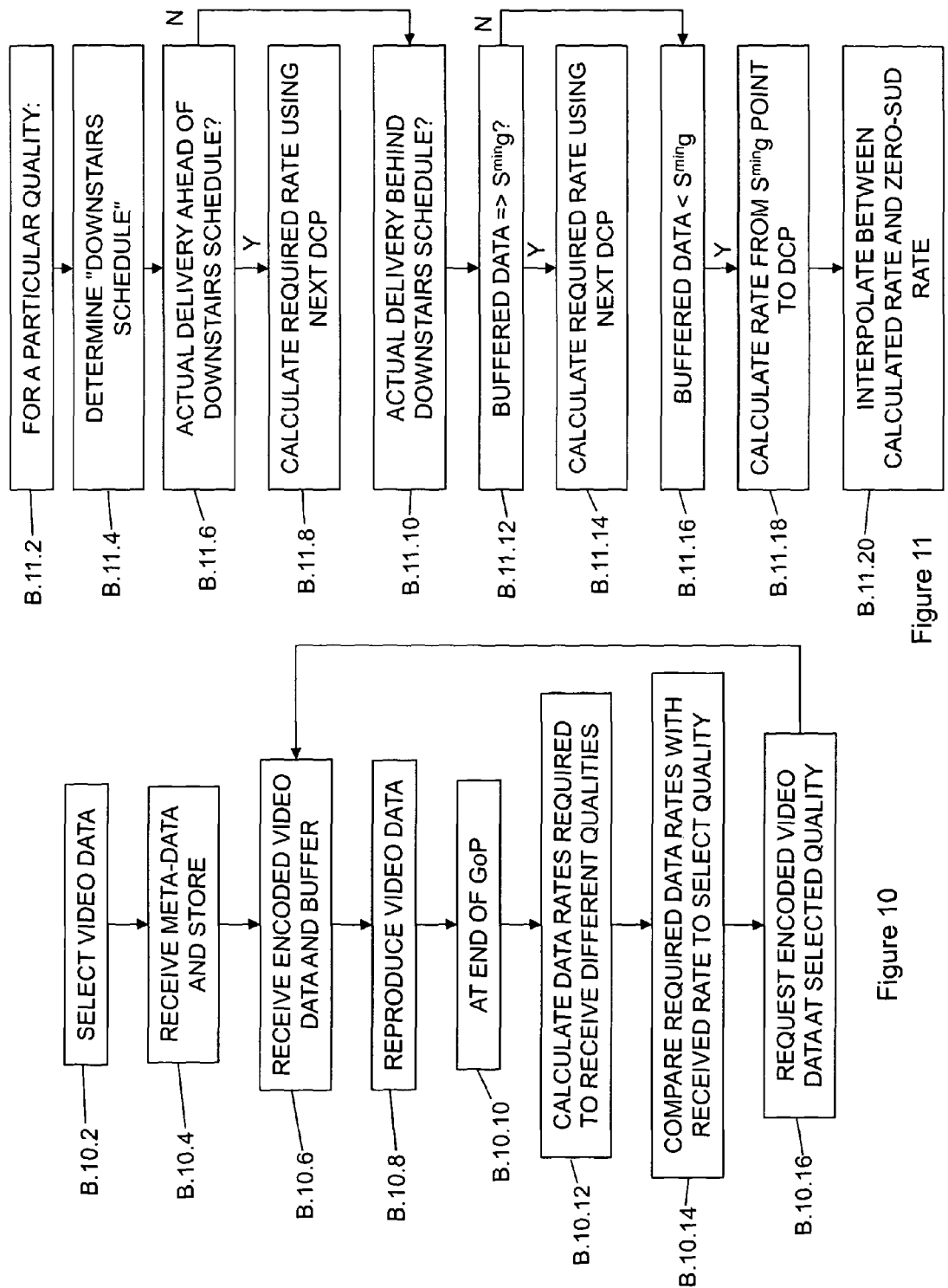
FIG. 10 is a flow diagram of the operation of the client device in an embodiment of the invention.
FIG. 11 is a flow diagram illustrating the processing performed to calculate data rates in an embodiment of the invention.

Having described the general system architectural overview of the embodiment of the invention, FIG. 10 illustrates the overall operation of the client device 20. In the embodiment, the client device 20 operates under the control of control program 2104, to allow a user to select a particular video program to be delivered from the video content server, for display. Once the user has selected the program, the client device 20 then controls the download and display of the content as will be described.

More particularly, at block 10.2 the client device 20, under the control of the user, selects a particular video data set 1028, such as a movie, or the like, to be downloaded from the video content server 10. That is, the processor 204 controls the network interface 202 to send a request to the video content server 10 in order to start streaming the requested video file to it. The request is received at output interface 104, and the processor 108 then causes the video content server 10 to download the encoded video meta data file 1024 for the requested video file to the client device. Therefore, at block 10.4, the client device 20 receives the encoded video meta data at the network interface 202, and stores it as encoded video meta data 2102, on the computer readable storage medium 210. The video content server 10 then starts to stream the encoded video data 1026 via the output interface 104 over the network 12 to the network interface 202 of the client device 20. A particular start up quality may be provided, or an arbitrary quality may be provided, such as, for example, the lowest quality, or the medium quality. Alternatively, the client device may have monitored the network delivery rate of the encoded video meta data 2102, and based on this data rate, and the data in the encoded video meta data, had determined which quality may be supported by the received data rate at which the encoded video meta data 2102 was delivered, using the techniques for delivery rate calculation, to be described. The client device 20 may then request the video content server 10 to initially provide video content data at the quality determined to be supported by the data rate.

Whichever quality is first provided, at block 10.6 the client device receives the encoded video data and passes the encoded video data to the decoder 208, which starts to consume the video data at the rate of the decoding schedule for the particular quality of the video data that is being delivered. Any excess data that is not required for immediate consumption is stored as buffered encoded video data 2106 on the computer readable storage medium 210, and is retrieved from the buffer 2106 via the decoder as required. It therefore follows that if the encoded video data is being delivered faster than the decoding schedule, then more and more data will be buffered in the buffer 2106. If, however, the encoded video data is being delivered at a rate less than the decoding schedule requires, then the buffer may underflow, and decoding and reproduction may temporarily halt. The decoder 208 reproduces the video data at block 10.8, and the reproduced video data is then output from video output 206, to display 22 for reproduction.

From time to time, the client device 20 should evaluate the delivery rate that it is actually receiving, in order to determine whether in fact a higher quality of video can be supported by the delivery rate, or whether quality needs to change to, for example, a lower quality. In the present example this is performed at the end of reproduction of every group of pictures, as shown at block 10.10. That is, at the end of each group of pictures (typically 24 frames or the like) the client device 20 makes use of the pre-calculated data in the encoded video meta data 2102, together with a measure of how much data is buffered, and the delivery rate that it has already seen, to calculate data rates that would be required from that point in time to receive the different available qualities of encoded video available. This is performed at block 10.12, and further details of how these calculations are performed will be described below. The output at block 10.12, however, is, for each quality that is available, a data rate that is required for delivery of that quality. These data rates can then be compared at block 10.14, with the rate that the client device has already been seeing, and a particular quality selected. For example, if the data rate that has been received so far is high enough to support a higher quality video, then that quality is selected, and then subsequently requested at block 10.16. In one example, the quality which most closely matches the viewed throughput is selected, with the proviso that the rate required for that quality must be less than the viewed delivery rate. Other factors, such as the amount of data buffered at the client, may also be taken into account when making the decision of which quality of video to transmit next. For example, it may be decided not to switch to a higher quality if less than a threshold of data, such as that which would take five seconds to display, were buffered at the client, or it may be decided to switch to a lower quality if a lesser threshold of data were buffered, regardless of how the expected network throughput compares to the delivery rate required for each quality of video encoding.

Howsoever the next quality is selected compared to the data rates, as noted at block 10.16 the client then requests the video content server 10 to supply encoded video data at the selected quality.

As noted, this procedure of data rate calculation, and quality selection can repeat as often as required, and in the particular example can be repeated as often as every group of pictures, as it is possible to change between the different encodings at the start of any group of pictures.

We have thus presented a general architectural level overview of the present example embodiment, including the system components, and their operation. Next we describe the specifics of how the particular data rates are calculated in block 10.12. Two different methods are generally used in the embodiments, depending on whether delivery has been ahead of the downstairs delivery schedule, calculated using the downstairs critical points, or whether it has been slower than the schedule given by those points.

Figure 5:
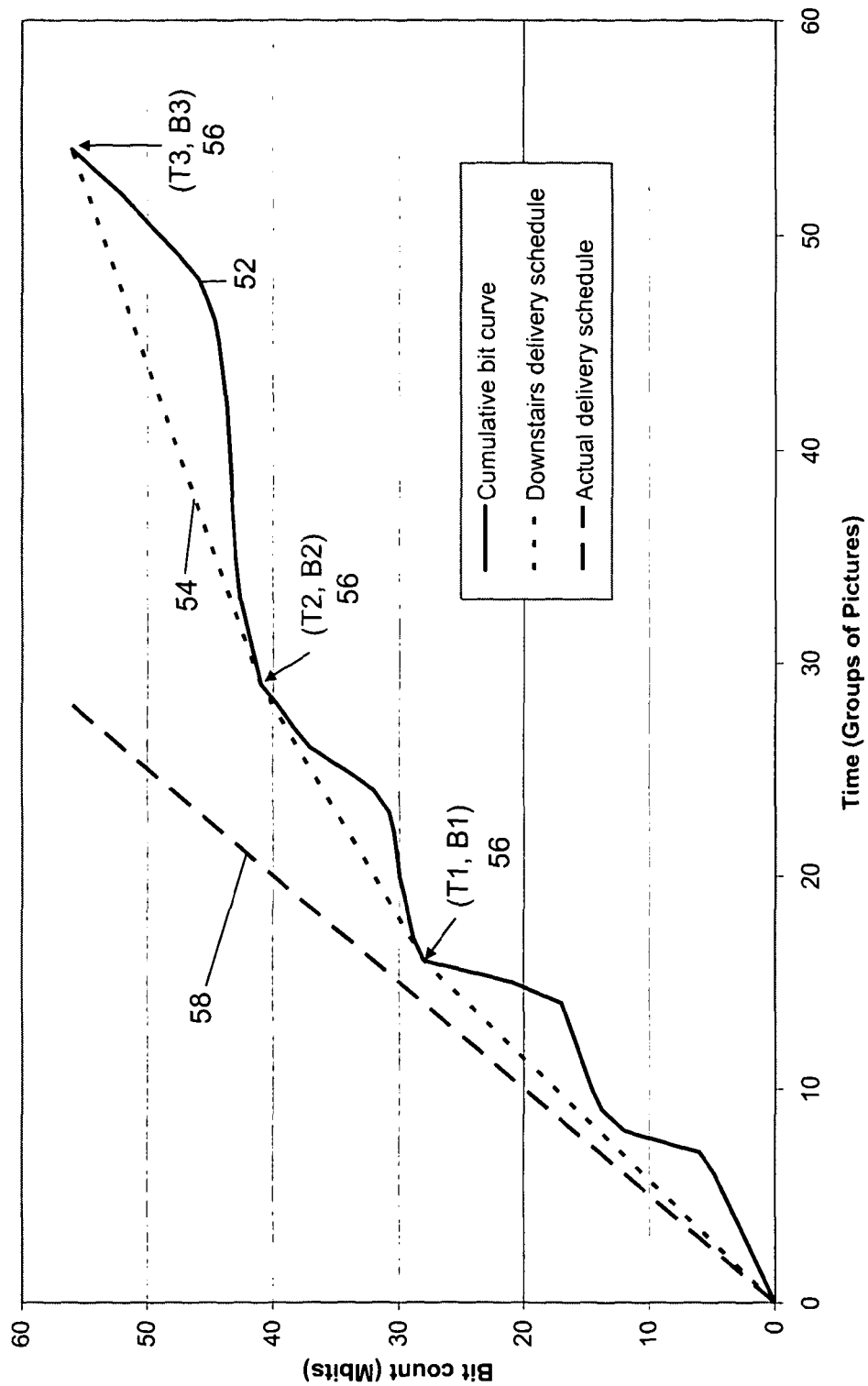
FIG. 5 is a graph of a cumulative bit curve.

Delivery Rate Calculation when Delivery is Ahead of the Downstairs Delivery Schedule Similar to FIG. 4, FIG. 5 shows a cumulative bit curve 52 for a video sequence encoded at variable bit rate and its piecewise constant, monotonic decreasing, delivery schedule, referred to as the "downstairs delivery schedule" 54. But it also shows a delivery schedule 58 for constant bit rate delivery at a rate faster than necessary for timely delivery. As discussed previously, at B.10.12 after delivery of each group of pictures, we calculate the required delivery rate for timely delivery of the next and all subsequent groups of pictures. In the present case, this requires knowledge of the "downstairs delivery schedule" across the cumulative bit curve, which is readily obtained from the meta data 2102, and in particular using the data in table 32 relating to DCP position in the GoP sequence, and the cumulative bit counts for those GoPs identified as DCPs. For example, the downstairs delivery rate between start-up and the first DCP is the ratio of the cumulative bit count ("CBC") at the DCP to the time at the DCP. Likewise, the rate between the first DCP and the second DCP is the ratio of the CBC difference between the first and second DCPs, and the time difference between the first and second DCPs.

Having determined the downstairs delivery schedule (or been provided with it), and knowing that it has been exceeded, in the present example then instead of using the other pre-calculated data in the meta-data, we observe that it is possible to calculate the required delivery rate simply by calculating the rate required to intercept with the "downstairs delivery schedule" at the points at which its slope changes, i.e. at the "critical points". By then selecting the maximum of these rates as the required delivery rate, the delivery rate can be determined. We proceed as follows, with reference to FIG. 5.

Let the actual delivery rate be D bits per group of pictures period. Let the time be t, also measured in group of pictures periods. Let the critical points be (T1, B1), (T2, B2) and (T3, B3) with T1, T2, and T3 being the times of the critical points, and B1, B2 and B3 being the number of bits that need to be delivered by those times. At time t, D times t bits would have been delivered. The rates R1, R2, and R3, required to deliver sufficient bits to satisfy each critical point are given by Equation 1.

$$R1 = \frac{B1 - D \cdot t}{T1 - t} \qquad [1]$$

$$R2 = \frac{B2 - D \cdot t}{T2 - t}$$

$$R3 = \frac{B3 - D \cdot t}{T3 - t}$$

where t<=T1<=T2<=T3.

The required delivery rate, R, is then calculated as the maximum of these rates R1, R2, and R3, as given by Equation 2.

$$R = \text{Max}\{R1, R2, R3\} \qquad [2]$$

Clearly from a visual representation, such as FIG. 5, when t=0, the most critical point will be (T1, B1) and the required delivery rate will be R1. But at some subsequent time, (T2, B2) will become the most critical point, and the required delivery rate will be R2. We can determine this time by setting R1=R2 in Equation 1, and by re-arranging it to find t, as in Equation 3.

$$t = \frac{B2 \cdot T1 - B1 \cdot T2}{B2 - B1 - (T2 - T1) \cdot D} \qquad [3]$$

In the case of FIG. 5, this happens at t=12. And by substituting this expression for t into Equation 1 for R1 (or for R2, as at this time they are equal), we get Equation 4

$$R1 = R2 = \frac{B2 - B1}{T2 - T1} \qquad [4]$$

This delivery rate is the same as the downstairs rate for delivery between time T1 and time T2.

Figure 6:
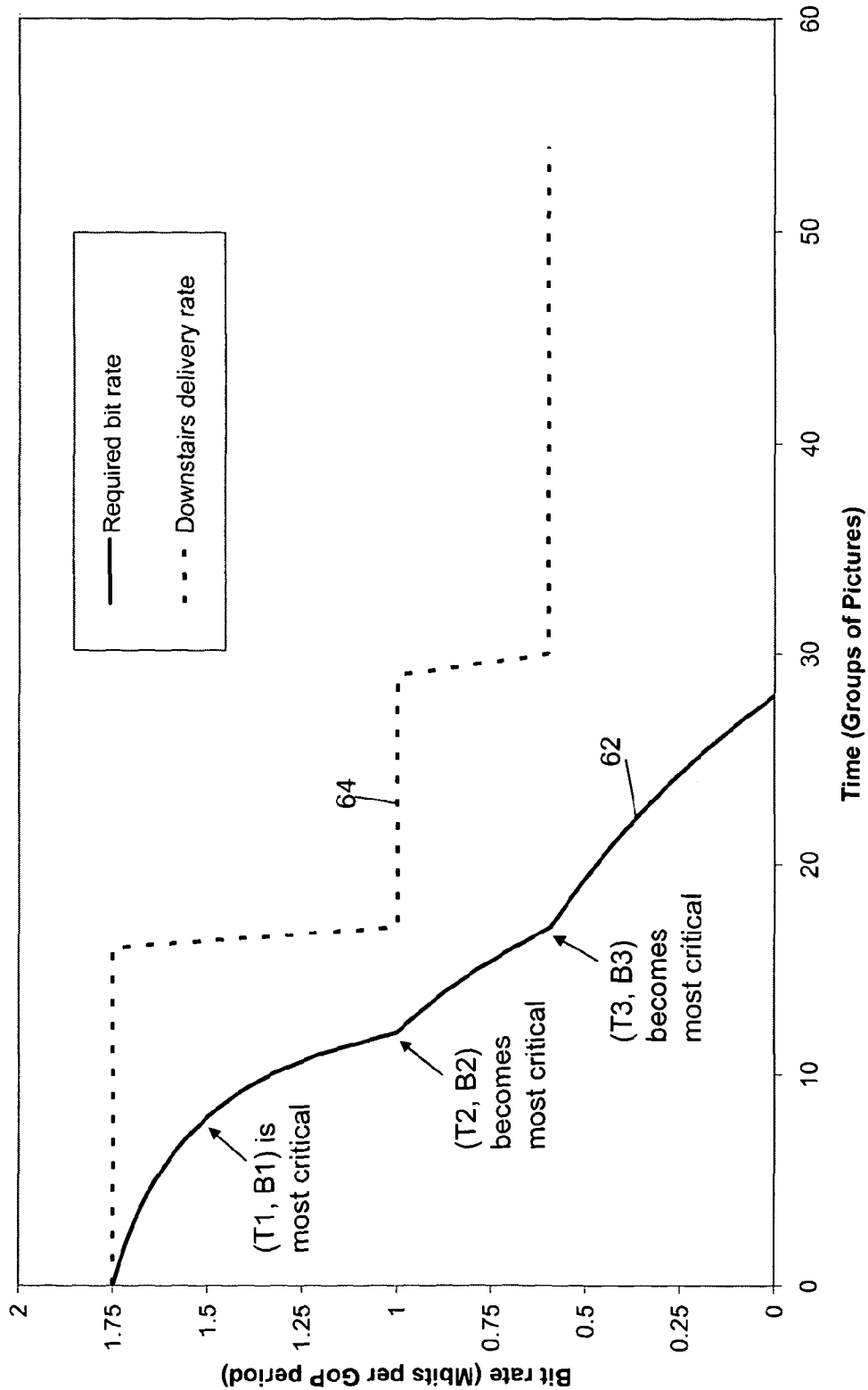
FIG. 6 is a graph of a plot of required bit rates calculated in an embodiment of the invention.

FIG. 6 shows how the required delivery bit rate 62 varies with time for the scenario of FIG. 5, showing that as more bits are delivered, the required delivery rate is determined by each of the critical points in turn, and at each transition, the required delivery rate is equal to the "downstairs" delivery rate 64 associated with the newly most critical point.

Hence if delivery is ahead of the "downstairs delivery schedule", that is, if at the current time, more data has been delivered than required by that schedule, then not only can the required rate be calculated from just the critical points, but also it is not necessary to check all of the critical points. On a first calculation, the rates required by each critical point, starting with the one with lowest bit count greater than the currently delivered number of bits, are calculated, iterating until a calculated rate is lower than the immediately previous one. On subsequent calculations it is only necessary to check this same critical point, and then only in the case that the calculated required rate is lower than the "downstairs" rate associated with the next critical point is it necessary to calculate the rate required by that next critical point.

With the above in mind, FIG. 11 illustrates in more detail the actions performed during B.10.12. The first point to note is that the client device 20 calculates rates required for each available video quality, and hence the above is performed for each quality (B.11.2). Once a particular rate is being determined for a particular quality, the downstairs schedule is first determined at B.11.4, either from being calculated as described, or looked up from a previous calculation thereof. At B.11.6 an evaluation as to whether the received rate so far has been such that delivery is ahead of the downstairs delivery schedule. If so, then this will mean that data will be buffered in buffer 2106, and that the rate required going forward will typically be less than that delivered so far, as shown in FIG. 6, where the required forward delivery rate decreases as more and more data is delivered and buffered.

If the delivery is ahead of the downstairs delivery schedule, then at B.11.8 the above noted procedure is performed to calculate the forward delivery rate, using the DCP data, and the CBC data. That is, the rest of the pre-calculated meta-data does not need to be used to calculate the forward delivery rates for each quality, when the historical delivery rate is ahead of the downstairs delivery schedule. Instead, in such a case, only the downstairs critical points are required, and the cumulative bit curve information. Thus, if the network were always able to deliver at at least the downstairs delivery schedule (or greater), then the only meta data that would be required would be the DCP information, comprising time index for each DCP, and the CBC data.

Figure 7:
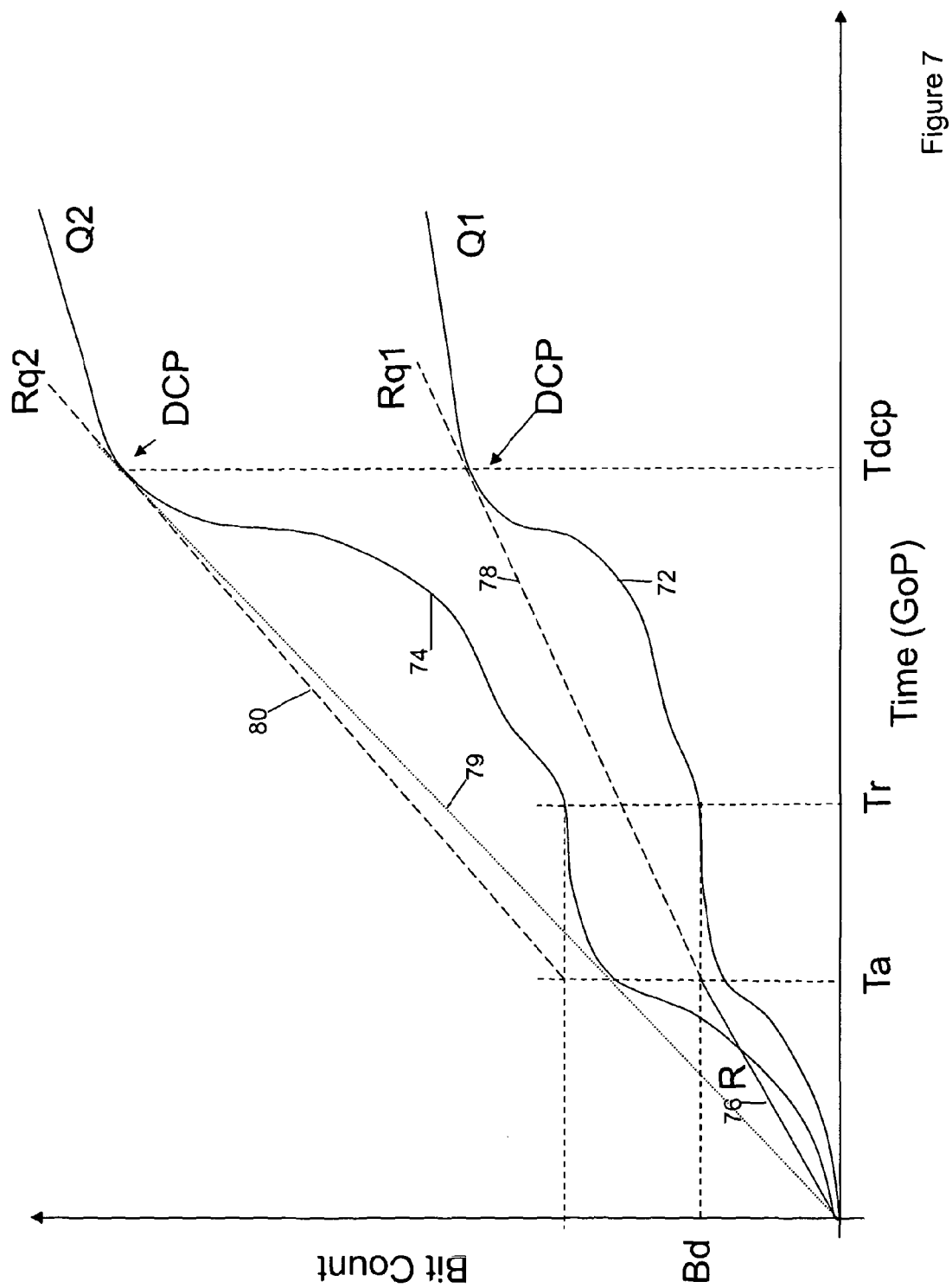
FIG. 7 is a plot of two cumulative bit curves used to illustrate the operation of an embodiment of the invention.

FIG. 7 illustrates an example of the calculation of data rates in accordance with the above for two different qualities. In FIG. 7, assume that encoded video data is being delivered at rate R, shown by line 76, and the encoded data is encoded at quality Q1, such that it has decoding schedule 72. The decoding schedule has a single downstairs critical point (DCP). In addition, in this example the video is also available from video content server 10 at quality Q2, which has decoding schedule 74. Decoding schedule 74 also has a single DCP, which is shown at the same time position Tdcp as the DCP of schedule 72 of Q1, although in other examples it could be at a different time position (and likewise there may be more than one such point). Delivery of Q1 data started at time 0, at rate R, and the present time is time Ta, which we know from the decoder 208, in terms of how many GoPs have been decoded. However, because rate R is greater than the downstairs schedule (not shown) for Q1 encoded data, Bd bits have been delivered. With the decoding schedule 72 of Q1, this means that there are bits in the buffer equal to Tr−Ta GoPs.

The effect of having bits in the buffer is essentially to "buy" time which can then be used in the calculation of the delivery rate required going forward, in that during the time the data in the buffer is being reproduced, the next data to be reproduced after the data in the buffer can be being downloaded. This is important to remember during a switch in quality, for example. In FIG. 7, imagine at point Ta quality was to be switched from Q1 to Q2. However, there are already Tr−Ta units of time worth of bits in the buffer of quality Q1. As there is no point downloading these again they may as well be reproduced at quality Q1, with that amount of time then being used to help download the bits of GoPs at Q2 to be displayed from time Tr.

With the above in mind, to determine the forward rate Rq1 required for continued delivery at quality Q1, a rate is obtained that is the ratio of the bit count at the next DCP of schedule 72 minus Bd bits already delivered, and the time difference between the time of the DCP, and the present time Ta.

However, to calculate the forward rate required for Q2 is slightly more involved, as it is necessary to know how many bits would need to have been decoded at time Tr, from the decoding schedule 74 of Q2, even though no Q2 bits have so far been downloaded and decoded. Whilst the amount of time from the present time Ta to the next DCP of Q2 can be calculated very easily from the DCP data, it is necessary to know how many bits need to be downloaded in that time in order to calculate the required data rate. However, we know that we have sufficient bits in the buffer to reproduce at Q1 until time Tr, and hence there is no point downloading bits from before time Tr of Q2. The number of bits of Q2 that would have been decoded at Tr therefore needs to be subtracted from the CBC at the DCP of Q2, to provide the number of bits that need to be downloaded. The delivery rate is therefore given by the ratio of the cumulative bit count at the DCP of Q2 minus the cumulative bit count of Q2 at Tr, against the amount of time between the present time Ta and the time of the DCP of Q2 i.e. Tdcp−Ta on FIG. 7.

It should be noticed that at the current delivery point for Q2 (i.e. the left end of line 80) delivery is ahead of the downstairs delivery schedule for Q2, shown by dotted line 79. Thus, had data from Q2 been delivered, delivery to get to the current delivery point of Q2 would have had to have been at a greater rate than that determined by the downstairs delivery schedule for Q2. What is important as far as Q2 is concerned is not therefore the actual delivery rate R that has been received (delivering data from Q1), but has been at such a rate that, as far as Q2 is concerned (in addition to Q1), delivery is ahead of the downstairs delivery schedule.

As shown in FIG. 7, forward delivery rate Rq1 is found for Q1, and forward delivery rate Rq2 for Q2. Comparing these rates to historical rate R, it will be seen that Rq1<R<Rq2, and hence R is not sufficient to support the delivery rate required for Q2, but is sufficient to support continued delivery of Q1. Hence, in this example content of quality Q1 is selected for continued delivery.

Delivery Rate Calculation when Delivery is not Ahead of the Downstairs Delivery Schedule While the above is a simple technique, it is limited in its application, as it is restricted to the case of being ahead of the "downstairs delivery schedule". In reality this may not be the case, and hence we will now show how a similar technique can be used in some cases when behind the "downstairs delivery schedule".

Figure 8:
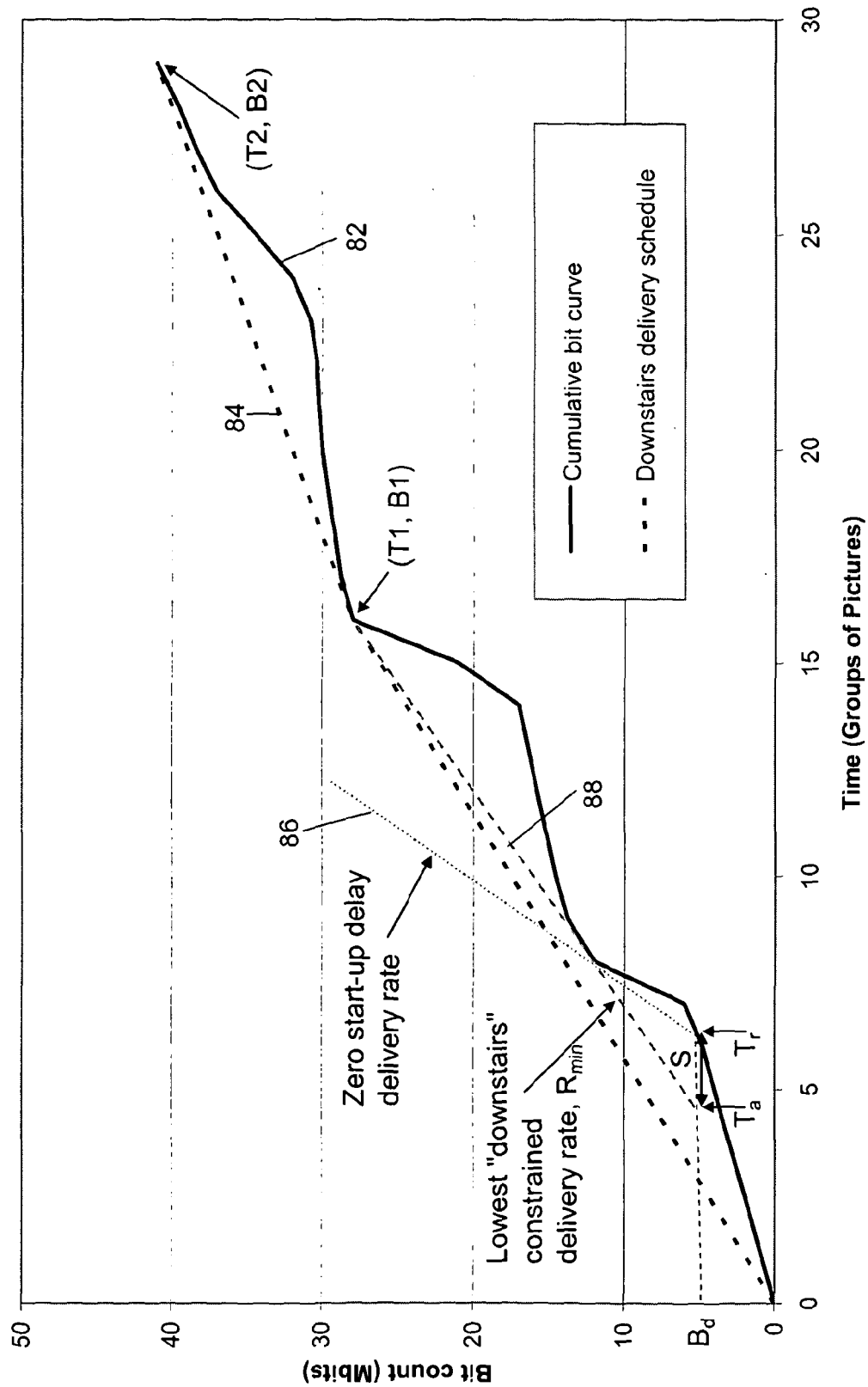
FIG. 8 is a plot of a cumulative bit curve used to illustrate the operation of an embodiment of the invention.

FIG. 8 shows a section of the cumulative bit curve and "downstairs delivery schedule" of FIG. 5. FIG. 8 shows a cumulative bit curve 88, and the associated downstairs delivery schedule 84. In FIG. 8 by way of example let the time when all of the currently transmitted bits will be decoded be $T_r$, and let the current time be $T_a$: this is the time at which the next bits transmitted will start arrive in the decoder buffer. Let $B_d$ be the cumulative bit count at time $T_r$: $B_d$ is indicative of the total number of bits that would have been delivered, if all received data had been encoded at this quality. In order to ensure sufficient bits have been delivered by the time, T1, of the next critical point (T1, B1) on the "downstairs delivery schedule" 84, (B1−$B_d$) bits need to be transmitted between time $T_a$ and time T1, requiring a rate R1 given by Equation 5.

$$R1 = \frac{B1 - B_d}{T1 - T_a} \quad [5]$$

It should be noted that this delivery rate is independent of how many bits are buffered at the decoder and hence independent of which quality of video stream they belong to: what matters is which video stream is to be delivered from this point in time, how much time will elapse before the next bits to be transmitted will be decoded, and how many bits need to be transmitted in the given time period.

While the rate R1 given by Equation 5 is sufficient to meet the demands of the next critical point (T1, B1), it may not be sufficient to deliver all intermediate groups of pictures in a timely fashion. Looking again at FIG. 8, if $B_d$ bits have been delivered in less time than required by the "downstairs delivery schedule", then the current delivery point is on the horizontal dashed line, to the left of its intersection with the "downstairs delivery schedule". In this case the required delivery rate can be determined from knowledge of this point and of all the following critical points on the "downstairs" delivery schedule: the rate R1 given by Equation 5 is sufficient to deliver all subsequent groups of pictures up to the point (T1, B1) in a timely fashion, but the rate required by subsequent critical points (T2, B2), etc, as calculated in Equation 1, must also be considered and the maximum determined, as above, to find the rate required for timely delivery of the remainder of the video sequence.

If $B_d$ bits have been delivered in more time than required by the "downstairs delivery schedule", then the current delivery point is on the horizontal dashed line, to the right of the "downstairs delivery schedule", but to the left of the cumulative bit curve, otherwise it would represent an invalid delivery schedule as the bits would not have been delivered in time for decoding. At these points it is not possible to determine the required delivery rate for all possible points on this line segment solely from knowledge of this point and all the following critical points on the "downstairs delivery schedule": there may be points on the decoding schedule that were not critical when starting at the beginning and delivering at the "downstairs" rate but are critical when starting at the current delivery point. It therefore becomes necessary to determine, for each point (i.e. for each GoP in the present example, as that is the timebase), whether it is possible to use the downstairs critical points as described previously to calculate the forward delivery rates required for a particular quality.

In order to do this, in the present example embodiment we provide as follows. Let the time when all of the currently transmitted bits will be decoded be $T_r$. In FIG. 8 this is the time at which the horizontal dashed line with bit count equal to $B_d$ intercepts the cumulative bit curve. Let $S_g$ be the difference between $T_r$ and $T_a$, that is, the length of time that will elapse before the next bits to be transmitted, which represent group of pictures g, will begin to be decoded. Let us define a threshold, $S^{min}_g$, on the value of $S_g$ such that if $S_g$ is greater than or equal to $S^{min}_g$, the required delivery rate can be determined from the next critical point on the "downstairs delivery schedule", but otherwise it can not be. Note that for current delivery points given by $S_g$ greater than or equal to $S^{min}_g$ and to the right of the "downstairs delivery schedule", the required delivery rate can be calculated from only the next critical point on the "downstairs delivery schedule": no other critical points on the "downstairs delivery schedule" need to be considered.

With the above definitions in mind, in the present embodiment we pre-calculate the critical points on the "downstairs delivery schedule", and for each group of pictures calculate the threshold $S^{min}_g$ above which the required delivery rate can be calculated from the next critical point on the "downstairs delivery schedule". We also pre-calculate for each GoP a delivery rate for having zero start up delay in decoding; in FIG. 8 this is shown as dotted line 86. And, optionally, we can pre-calculate the start up delay required for each of a set of delivery rates, defined, for example, as fixed multiples of the delivery rate required when the start up delay is $S^{min}_g$, a rate which itself does not need to be stored in the pre-calculated data as it could easily be calculated from the critical points on the "downstairs delivery schedule" and the threshold $S^{min}_g$ which are present in the pre-calculated data.

We can minimise the amount of pre-calculated data by omitting the optional step, in which case we can calculate precise required delivery rates whenever the amount of data buffered at the decoder (the start up delay for the next data to be delivered), $S_g$, is greater than or equal to the threshold $S^{min}_g$, and can use interpolation between the rate required for start up delay $S^{min}_g$ and the rate required for zero start up delay for lower values of start up delay, $S_g$. Alternatively, in another embodiment we can perform the optional step and calculate the start up delays required for additional rates, which while increasing the amount of pre-calculated data, does allow for more accurate interpolation of the required delivery rate when the start up delay, $S_g$, is less than $S^{min}_g$. These additional rates could be fixed multiples of the delivery rate required when the start up delay is $S^{min}_g$ as described above, or could be related to this rate and the rate required for zero start up delay, such as being the average of the two, or could be chosen in any way, subject to the rates being greater than the delivery rate required when the start up delay is $S^{min}_g$, as lower values provide no additional useful information as for such cases the required delivery rates can be calculated from the critical points on the "downstairs delivery schedule".

Regarding the interpolation that is required in one embodiment a linear interpolation may be performed between the rate required for start up delay $S^{min}_g$ and the rate required for zero start up delay. However, in other embodiments an interpolated rate can be obtained by using the rate interpolation techniques described in our prior co-pending United Kingdom patent application GB 1011047.6, or in our prior co-pending European Patent Application no EP10251540.0, the entire contents of which are incorporated herein for all purposes, and in particular in relation to the interpolation of a rate between the rate required for start up delay $S^{min}_g$ and the rate required for zero start up delay.

As discussed previously with respect to FIG. 3, an example of a pre-calculated file that is stored as the encoded video meta data would therefore contain, for each group of pictures, for each quality encoded: start up delay $S^{min}_g$ above which the delivery rate can be calculated from the "downstairs delivery schedule"; and the delivery rate needed for zero start-up delay. In addition, the critical points on the "downstairs delivery schedule" would be stored once for the entire video sequence for each quality encoded. The CBC schedule indexed by GoP would also be included. Optionally, in another embodiment the start-up delay required for various multiples of the required delivery rate for start up delay $S^{min}_g$, e.g. 1.2, 1.4, . . . 2.0 times this rate may also be included.

Figure 12:
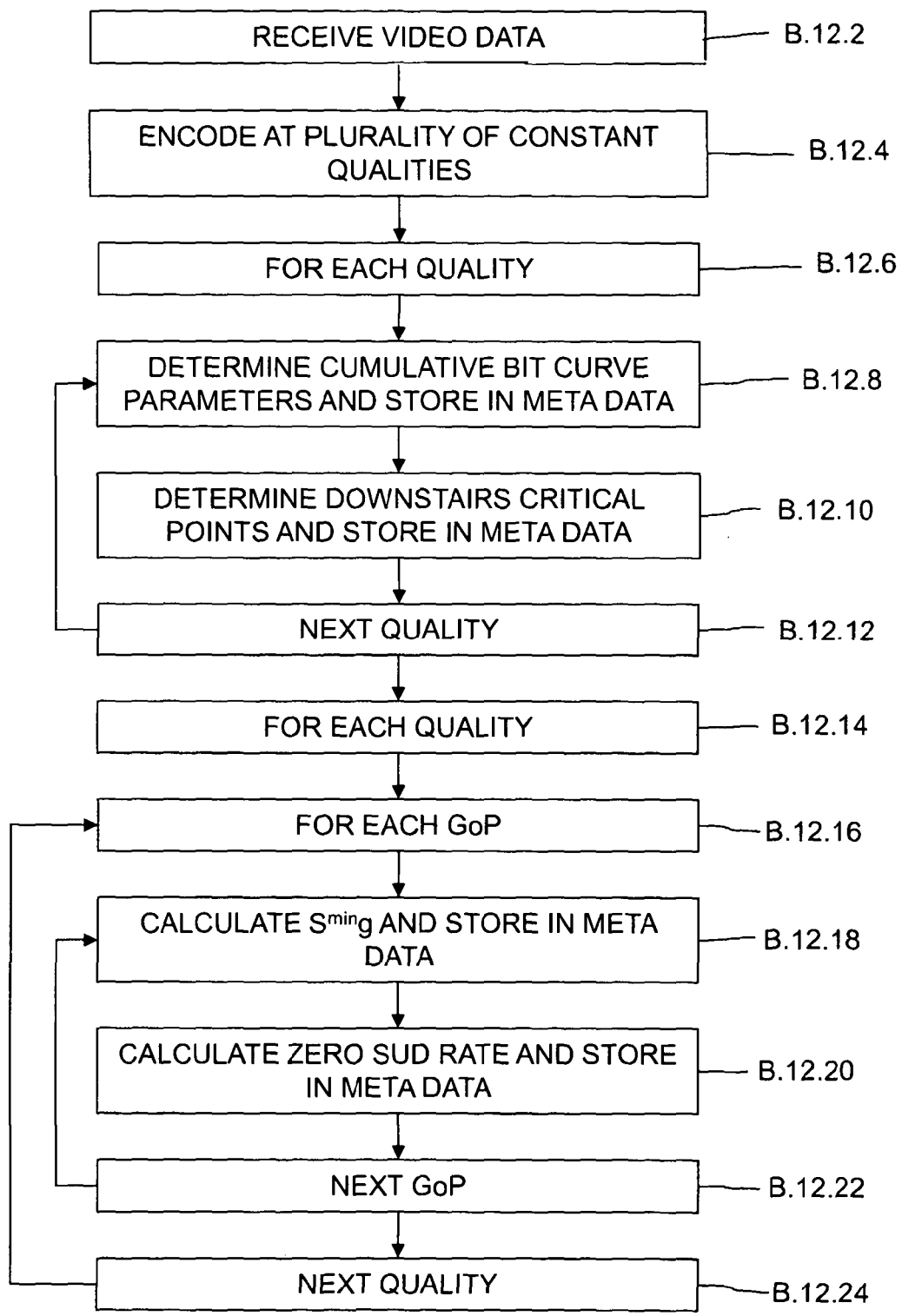
FIG. 12 is block diagram of part of the operation of the video content server of the embodiment.

In terms of the pre-calculation of the encoded video meta data, this is performed in the present embodiment by video content server 10, operating according to the process shown in FIG. 12. Here, imagine some new video content, such as a new movie or the like, is provided to the video content server, at B.12.2. At B12.4 the video encoder encodes the received content to produce a plurality of different encoded versions 1026, each encoded at different constant qualities. These are then stored in storage medium 108, as shown. Next it is then necessary to pre-calculate the meta data 1024 for the set 1028 of different quality encoded data.

At B.12.6 we start a loop to process each encoded video file of different quality in the set 1028, and then for the present encoded file being processed at B.12.8 determine the cumulative bit curve parameters, which are stored in the meta data. These are determined by stepping through the encoded file from GoP to GoP and counting the bits. In addition, once the cumulative bit curve has been found, the downstairs critical points (DCPs) can then be found, from the cumulative bit curve. These are also stored in the meta data file.

At B.12.12. an evaluation is performed as to whether the above has been performed for every different quality level, and if not the next quality level file is selected, and the process repeated. Once all of the different quality files 1026 have been processed, then by that point the cumulative bit curves and downstairs critical points will have been found for each different quality version of the encoded video data.

Next, at B.12.14 another processing loop is started to process each different quality version in turn again. At B.12.16 each GoP is then looked at in turn, in this embodiment in reverse order, as described further below. The purpose of this inner processing loop is to calculate the values of $S^{min}_g$ and zero start-up delay rate for each GoP, at B.12.18, and B.12.20.

We calculate the value of $S^{min}_g$ as follows. As noted, we assume here that the video sequence has already been encoded, the number of bits used to encode each group of pictures have been counted, and the "downstairs delivery schedule" and the critical points on it have been calculated, $S^{min}_g$ is then found for each GoP by following the following process.

1. Let g be the index of a group of pictures, and let $B_g$ be the cumulative bit count for group of pictures g (g=1 . . . G), for encoding at quality q, as given in Equation 6, and let $B_0$=0. Let c be an index (c=1 . . . C) into the set of critical points on the "downstairs delivery schedule", ordered in increasing time order. Set c=1, to index the first of these critical points.

$$B_g = \sum_{j=1}^{g} b_{qj} \qquad [6]$$

Note that although $B_g$ is strictly a function of the quality of the stream, indexed by q, and should be written as $B_{qg}$, we have chosen to omit the subscript q in the description of this process for clarity: The same applies to $S^{min}_g$, $T_c$ and $B_c$, as defined below, which are also functions of the quality of the stream.

2. Let $T_c$ be the index of the group of pictures of the critical point with index c, at which the cumulative bit count is $B_c$ bits. Note that $B_c$ and $B_{T_c}$ are different labels for the same actual number of bits. Set the delivery rate, $R_{min}$, to the total number of bits in the video sequence divided by one group of pictures period. Note any large value would suffice provided it is larger than any of the values of $R_g$ calculated in the subsequent steps.

3. Set g=$T_c$

4. Calculate, $R_g$, the average coded rate of groups of pictures g to $T_c$ inclusive:

$$R_g = \frac{B_c - B_{g-1}}{T_c - g + 1} \qquad [7]$$

5. Compare $R_g$ with $R_{min}$, and if lower, set $R_{min}$ to $R_g$:

$$R_{min} = \begin{cases} R_g & \text{if } R_g < R_{min} \\ R_{min} & \text{otherwise} \end{cases} \qquad [8]$$

6 Calculate the value of the threshold $S^{min}_g$ for group of pictures g, noting that $R_{min}$, is the highest required delivery rate that can be calculated solely from knowledge of the next critical point "downstairs delivery schedule", $(T_c, B_c)$. It can be seen from FIG. 8 that $R_{min}$ can be expressed as in Equation 9.

$$R_{min} = \frac{B_c - B_{g-1}}{T_c - g + 1 + S^{min}_g} \quad [9]$$

This can be re-arranged for $S^{min}_g$, as in Equation 10.

$$S^{min}_g = \frac{B_c - B_{g-1}}{R_{min}} - (T_c - g + 1) \quad [10]$$

Set g=g−1.
8 If c>1 and g>$T_{c-1}$, that is, if not the first critical point and if g is greater than the index of the critical point $(T_{c-1}, B_{c-1})$ on the "downstairs delivery schedule" immediately previous to $(T_c, B_c)$, go to step 4.
9 If c=1 and g>0, go to step 4.
10 Set c=c+1. If c≤C, that is, if c is a valid index, go to step 2, otherwise terminate.

Note. The reason for calculating backwards from the next critical point is that it allows the minimum rate, $R_{min}$, to be calculated for each group of pictures between two critical points in a single iteration over those groups of pictures.

Figure 9:
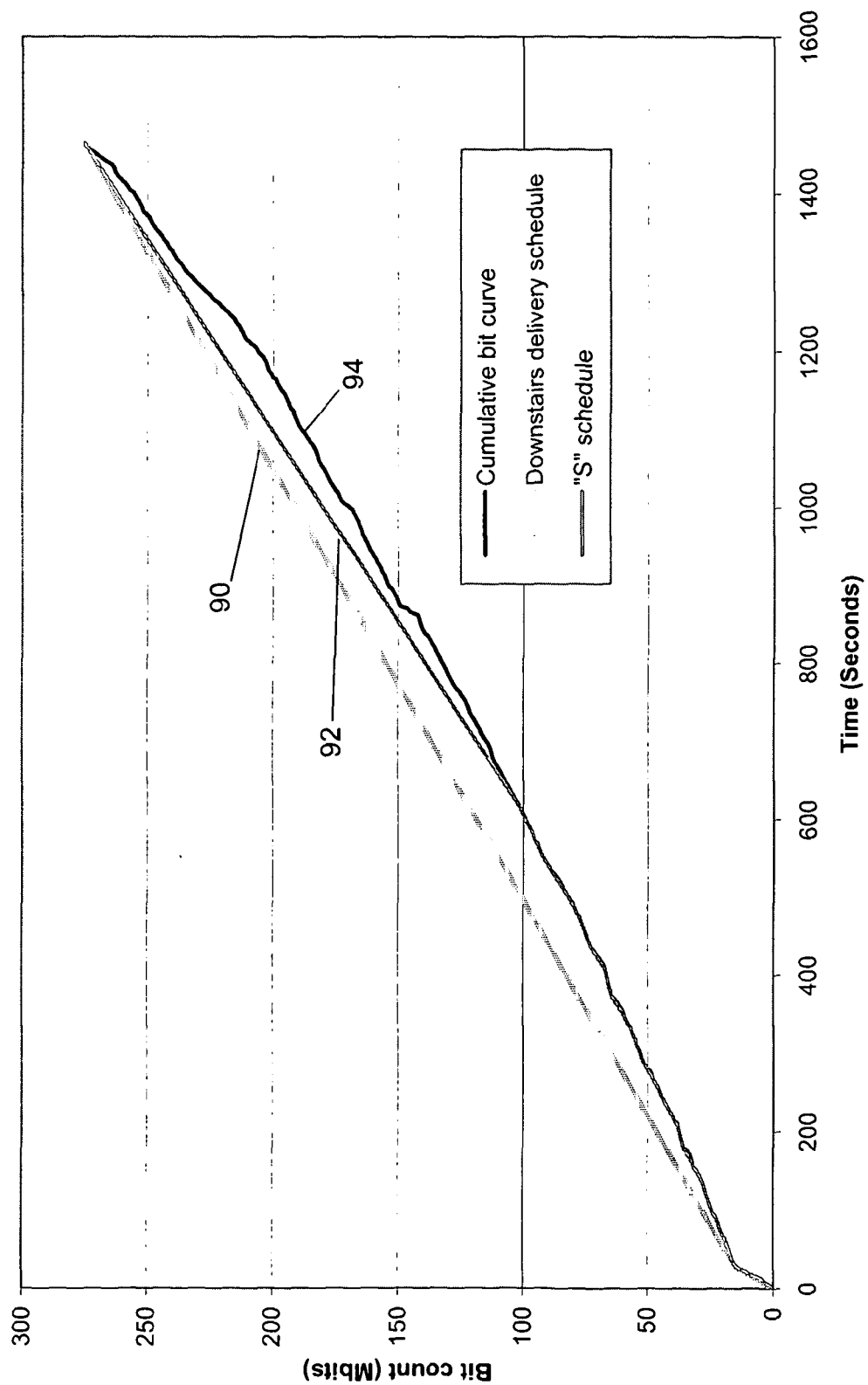
FIG. 9 is a plot showing the variation in a threshold parameter in an embodiment of the invention.

We now illustrate typical values of this parameter $S^{min}_g$, the lowest values of start up delay for which the required delivery rate could be calculated from the critical points on the "downstairs delivery schedule". FIG. 9 shows a cumulative bit curve and "downstairs delivery schedule" for a real piece of video content encoded at constant quality. Also shown on the figure is the value of $S^{min}_g$ for each group of pictures, drawn as a curve consisting of one point for each group of pictures, g, at $(g-S^{min}_g, B_g)$. It is observed that for the first 640 groups of pictures (about 615 seconds in this case of 24 pictures per group of pictures and 25 pictures per second), the value of $S^{min}_g$ tends to be low, but subsequently large values occur.

The reason for this is not clear from FIG. 9 due to the scale at which it is drawn but is actually due to some groups of pictures just before the end of the video sequence being encoded with only a small number of bits. This leads to a relatively small value of $R_{min}$ for all groups of pictures from about 640 to 1523, just two groups of pictures before the end of the video sequence.

Returning to FIG. 12, therefore, once the $S^{min}_g$ value has been found, the zero start-up delay value is found. As shown in FIG. 8, pictorially this is found by starting with a high rate beginning at Tr, and reducing the rate until a rate is found which just touches the cumulative bit curve at a future point. That rate is then used as the zero-start-up delay rate. As shown in both B.12.18, and 12.20 both the found $S^{min}_g$ values and zero start-up rates are stored in the meta data. At B.12.22, and 12.24 evaluations are performed to ensure that each GoP in each different quality version of the video content is processed. The complete resulting set of meta-data is stored as meta data 1024.

Mathematically, the zero-start-up rate is found using the following equation, where the present GoP for which the rate is being found is g, h refers to future GoPs in the decoding schedule, and $B_h$ and $B_{g-1}$: are the cumulative bit counts for GoPs h and g−1 respectively:

$$\text{Max}\left\{\frac{B_h - B_{g-1}}{h - g + 1}\right\} \quad [11]$$

for all $h \geq g$

Thus far, therefore, we have shown how the data rate can be found when the actual delivery is ahead of the downstairs delivery schedule, and we have discussed how the various meta data values are calculated and may be used to determine rates when the delivery rate is less than the downstairs rate. For completeness, return to FIG. 11, where we have discussed already B.11.2 to 11.8. To recap, FIG. 11 is performed by the client device 20 during B.10.12.

Assume that the actual delivery schedule achieved is behind the downstairs delivery schedule i.e. in the context of FIG. 8 the rate has been such as to deliver data with a latest reproduction time of Tr in time Ta, thus giving S=Tr−Ta in the buffer. In this case, B.11.6 returns negative, and processing proceeds to B.11.10, which returns positive, thus proceeding processing to B.11.12. Here, value S is compared to the stored value $S^{min}_g$ in the meta data for GoP of time Tr, and if it is greater than $S^{min}_g$ it is determined that rate can be found using the downstairs control points, and this is performed at B.11.14. This situation is shown in FIG. 8, and can be represented pictorially by finding the gradient of the straight line from bits Bd, being the cumulative bit count at time Tr, at time Ta to the next DCP, at (T1, B1).

However, if S had been less than $S^{min}_g$, then a rate calculated using the downstairs critical points would lead to buffer underflow eventually (around time 8 in the example of FIG. 8), and hence cannot be used. In this case evaluation B.11.12 returns negative, and processing proceeds to B.11.16, which returns positive. Then, at B.11.18 a rate is found from a time point as if there was $S^{min}_g$ in the buffer to the DCP i.e. Tr−$S^{min}_g$, and B1−Bd bits had to be downloaded in time T1−Tr−$S^{min}_g$. At B.11.20 an interpolation is then performed between this found rate, and the zero delay start-up rate for time Tr, dependent on the actual value of S, and the ratio of S to $S^{min}_g$. This interpolated rate is then used as the forward rate for the present particular quality, during the quality selection in B.10.14.

In terms of the interpolation that is used, as described previously in one embodiment a linear interpolation may be used. However, in other embodiments different interpolation techniques may be used, and particularly those described in our prior co-pending patent applications GB 1011047.6, and EP10251540.0.

With the above, therefore, we have shown how data rates for different quality variable bit rate encoded content files can be determined, in dependence on whether the actual delivery rate already received is ahead of schedule or behind schedule. Various pre-calculated data is provided to a client device in advance of the streaming, which is then used during receipt of a video stream to calculate forward delivery rates required for different quality levels. When delivery is ahead of schedule, then less pre-calculated data is needed to calculate forward delivery rates than when delivery is behind schedule.

Various modifications, whether by way of addition, deletion, or substitution may be made to the above described embodiments to provide further embodiments, any and all of which are intended to fall within the scope of the appended claims.

The invention claimed is:

1. A method for delivering encoded content data over a network, the content data being encoded at one or more quality levels, the method comprising:
   determining one or more respective data rates required to deliver the encoded content data at the one or more quality levels; and
   selecting a quality level for delivery in dependence on at least the one or more determined respective data rates;
   the method being characterised in that the determining of a data rate for a particular quality level comprises:
   being provided with pre-calculated data defining one or more critical points on a decoding schedule of the encoded data at the particular quality level, the critical points being points at which a piecewise monotonic decreasing-constant bit rate delivery schedule required to deliver the encoded content data so that buffer underflow does not occur is equal to the decoding schedule; and
   when actual delivery of the encoded content data is ahead of the constant bit rate delivery schedule, calculating the data rate required for delivery of remaining encoded data at the particular quality level in dependence on at least the critical points on the decoding schedule.

2. A method according to claim 1, wherein a critical point defines a cumulative bit count Bdcp at a specific time Tdcp in the decoding schedule of a set of encoded content data of a particular quality level.

3. A method according to claim 1, wherein the data rate for the particular quality is calculated in further dependence on the decoding schedule of the set of encoded content data of the quality, and the amount of encoded content data already delivered and decoded.

4. A method according to claim 3, wherein the calculation of the data rate comprises: determining a latest timepoint Tr in the set of encoded content data at which already delivered bits will be decoded;
   determining a cumulative bit count Bd for the particular quality level at the latest time Tr;
   determining the present timepoint Ta in the set of encoded content data corresponding to the data just decoded;
   determining the required data rate as the ratio of the difference between the cumulative bit count Bdcp of the critical point and the cumulative bit count Bd at the latest time Tr, and the difference between the time Tdcp of the critical point and the present timepoint Ta.

5. A method according to claim 1, wherein the method further comprises, when actual delivery is behind the constant bit rate delivery schedule, determining the amount of reproduction time Sg available from any delivered encoded content data that has not yet been decoded, and comparing the determined amount with a pre-calculated threshold $S^{min}g$, wherein the calculating the data rate of a particular quality is made in dependence on at least the critical points if Sg is greater than the threshold $S^{min}g$.

6. A method according to claim 5, wherein if the reproduction time available Sg is less than the pre-calculated threshold $S^{min}g$ then the data rate is calculated in dependence on a pre-calculated zero start-up delay rate, and a data rate calculated to the critical point as if there had been $S^{min}g$ data available.

7. A method according to claim 6, wherein the data rate is interpolated between the $S^{min}g$ rate and the pre-calculated zero start-up delivery rate.

8. A method according to claim 1, wherein the data rate is calculated in respect of a plurality of sets of encoded video data of a respective plurality of qualities.

9. A method according to claim 1, and further comprising storing a set of meta-data relating to encoded content data to be received, the meta-data comprising pre-calculated data relating to properties of the sets of encoded content data of the plurality of qualities.

10. A method according to claim 9, wherein the set of meta data comprises, for each set of encoded content data of a particular quality, for each unit of encoded data in a set, a cumulative bit count, a time threshold value $S^{min}g$, and a zero-start up delay rate value.

11. A method according to claim 9, wherein the set of meta-data further comprises the pre-calculated data defining the one or more critical points.

* * * * *